United States Patent
Eddy (10) Patent No.: US 9,542,332 B2
(45) Date of Patent: Jan. 10, 2017

(54) SYSTEM AND METHOD FOR PERFORMING HARDWARE PREFETCH TABLEWALKS HAVING LOWEST TABLEWALK PRIORITY

(71) Applicant: VIA ALLIANCE SEMICONDUCTOR CO., LTD., Shanghai (CN)

(72) Inventor: Colin Eddy, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 89 days.

(21) Appl. No.: 14/540,585

(22) Filed: Nov. 13, 2014

(65) Prior Publication Data

US 2016/0140046 A1  May 19, 2016

(51) Int. Cl.
| | |
|---|---|
| G06F 12/00 | (2006.01) |
| G06F 13/00 | (2006.01) |
| G06F 13/28 | (2006.01) |
| G06F 12/10 | (2016.01) |
| G06F 12/02 | (2006.01) |

(52) U.S. Cl.
CPC ....... *G06F 12/1009* (2013.01); *G06F 12/0215* (2013.01); *G06F 2212/1021* (2013.01); *G06F 2212/152* (2013.01); *G06F 2212/502* (2013.01)

(58) Field of Classification Search
CPC .............. G06F 12/0802; G06F 12/0859; G06F 12/1045; G06F 2212/306
USPC ...................................................... 711/169
See application file for complete search history.

(56) References Cited

U.S. PATENT DOCUMENTS

| | | | | |
|---|---|---|---|---|
| 5,564,111 A | * | 10/1996 | Glew ..................... | G06F 9/3842 711/202 |
| 5,613,083 A | * | 3/1997 | Glew .................. | G06F 12/1027 711/207 |
| 5,963,984 A | * | 10/1999 | Garibay, Jr. ........ | G06F 12/1027 711/202 |
| 7,793,067 B2 | * | 9/2010 | Kegel ................. | G06F 12/1027 710/22 |
| 2003/0093636 A1 | * | 5/2003 | Henry ................. | G06F 12/0802 711/158 |
| 2003/0191900 A1 | * | 10/2003 | Hooker ............... | G06F 9/30047 711/137 |
| 2006/0031640 A1 | * | 2/2006 | Henry ................. | G06F 12/0802 711/126 |

(Continued)

*Primary Examiner* — Sheng-Jen Tsai
(74) *Attorney, Agent, or Firm* — Gary Stanford; James W. Huffman (57) ABSTRACT

A hardware prefetch tablewalk system for a microprocessor including a tablewalk engine that is configured to perform hardware prefetch tablewalk operations without blocking software-based tablewalk operations. Tablewalk requests include a priority value, in which the tablewalk engine is configured to compare priorities of requests in which a higher priority request may terminate a current tablewalk operation. Hardware prefetch tablewalk requests having the lowest possible priority so that they do not bump higher priority tablewalk operations and are bumped by higher priority tablewalk requests. The priority values may be in the form of age values indicative of relative ages of operations being performed. The microprocessor may include a hardware prefetch engine that performs boundless hardware prefetch pattern detection that is not limited by page boundaries to provide the hardware prefetch tablewalk requests.

20 Claims, 3 Drawing Sheets

(56) References Cited

U.S. PATENT DOCUMENTS

| | | | |
|---|---|---|---|
| 2011/0202724 A1* | 8/2011 | Kegel | G06F 12/1027 |
| | | | 711/118 |
| 2013/0227245 A1* | 8/2013 | Gupta | G06F 12/1027 |
| | | | 711/205 |
| 2014/0129806 A1* | 5/2014 | Kaplan | G06F 9/3824 |
| | | | 712/220 |
| 2014/0258674 A1* | 9/2014 | Kim | G06F 12/1027 |
| | | | 711/204 |
| 2015/0286270 A1* | 10/2015 | Padmanabhan | G06F 1/3275 |
| | | | 711/154 |

* cited by examiner

SYSTEM AND METHOD FOR PERFORMING HARDWARE PREFETCH TABLEWALKS HAVING LOWEST TABLEWALK PRIORITY

BACKGROUND OF THE INVENTION

Field of the Invention

The present invention relates in general to performing tablewalks in a microprocessor, and more particularly to performing hardware prefetch tablewalk operations having a lowest tablewalk priority for improving performance.

Description of the Related Art

Modern processors support virtual memory capability. A virtual memory system maps, or translates, virtual addresses used by a program to physical addresses used by hardware to address memory. Virtual memory has the advantages of hiding the fragmentation of physical memory from the program, facilitating program relocation, and of allowing the program to see a larger memory address space than the actual physical memory available to it. These advantages are particularly beneficial in modern systems that support time-sharing of the processor by multiple programs or processes.

A common virtual memory scheme supported by microprocessors is a paged memory system. A paged memory system employs a paging mechanism for translating, or mapping, virtual addresses to physical addresses. The physical address space is divided up into physical pages of fixed size. A common page size is 4 kilobytes (KB). The virtual addresses comprise a virtual page address portion and a page offset portion. The virtual page address specifies a virtual page in the virtual address space. The paging mechanism of the microprocessor translates the virtual page address into a physical page address. This process is known as page translation. The page offset specifies a physical offset in the physical page, i.e., a physical offset from the physical page address.

The operating system decides which physical pages in memory will be mapped to each virtual page and maintains page mapping information that specifies the mappings. When the microprocessor encounters an instruction that specifies a virtual address to access a location in memory, such as a load or store instruction, the microprocessor translates the virtual address to the proper physical address by using the operating system's page mapping information. The operating system maintains the page mapping information in system memory. Thus, the microprocessor reads the appropriate page mapping information from memory to translate the virtual address into the physical address. The page mapping information is typically hierarchically arranged in order to reduce its size, which requires the microprocessor to traverse the hierarchy by performing read operations at multiple levels of the hierarchy. For this reason, and because at least a portion of the page mapping information is commonly referred to as page tables, the process of the microprocessor traversing the page mapping information to translate a virtual address to a physical address is commonly referred to as a page table walk, or simply a tablewalk. The tablewalk operation thus translates a virtual address or the like into a physical address or physical address translation, more generally referred to as a translated address.

As an example, a popular hierarchical page mapping information scheme includes a first level page directory and second level page tables. Each entry in the page directory points to a different page table, and each entry in each page table includes the physical or translated address and characteristics of the page mapped to that entry. The base address of the page directory is stored in a register of the microprocessor. Such a scheme is illustrated in FIG. 3-12 on page 3-23 of the IA-32 Intel Architecture Software Developer's Manual, Volume 3A: System Programming Guide, Part 1, document number 253668-020US, published June 2006 by the Intel Corporation, which is incorporated by reference herein for all purposes. In this example, the microprocessor performs a tablewalk by reading the page directory entry at the index within the page directory specified by page directory entry bits in the upper portion of the virtual address. The page directory entry specifies the base address of the relevant page table. The microprocessor then reads the page table entry at the index within the page table specified by page table bits in the middle portion of the virtual address. The page table entry specifies the translated address of the relevant page. The page table entry also includes characteristics for each page. For example, the page characteristics may include an indication of whether the page has been accessed; whether the page has been written; caching characteristics, such as whether the page is cacheable and, if so, the write-back caching policy; which privilege level is assigned to the page; the write privileges of the page; and whether the page is present in physical memory.

The operating system populates the page directory entries and page table entries with the page characteristic values. However, the microprocessor also updates some of the page characteristics in response to program execution. For example, in the Intel scheme mentioned above, the processor writes the relevant page directory entry and/or page table entry to update the Accessed and/or Dirty bits in response to the program reading and/or writing memory pages. Thus, when performing a tablewalk, in addition to reading the page mapping information from system memory to translate a virtual address to a translated address (e.g., physical address or physical address translation), the processor may sometimes also have to write the page mapping information in system memory.

Because the page mapping information resides in system memory, and accesses to system memory are relatively slow, it is a relatively costly operation for the microprocessor to perform a tablewalk to perform a virtual to physical address translation and to obtain and/or update the page characteristics. To improve performance by reducing the number of tablewalks, many microprocessors provide a mechanism for caching the page mapping information. The page mapping information cache is commonly referred to as a translation lookaside buffer (TLB). When the microprocessor encounters a memory access instruction, the microprocessor provides the virtual address to the TLB and the TLB performs a lookup of the virtual page address. If the virtual page address hits in the TLB, then the TLB provides the corresponding translated physical page address and page characteristics, thereby avoiding the need to perform a tablewalk. However, if the virtual page address misses in the TLB, then the microprocessor performs a tablewalk. Thus, in addition to reading the page mapping information from memory and updating the page mapping information as necessary, the tablewalk also includes the microprocessor allocating an entry in the TLB and updating it with the translated physical address and page characteristics.

To summarize, broadly speaking, a tablewalk includes three steps. The first step is to read the necessary page mapping information from memory required to translate the virtual address to a translated address and to obtain the page characteristics. The second step is to update the page mapping information in system memory, if necessary. The third step is to allocate a TLB entry and update it with the new page mapping information.

Many modern microprocessors are superscalar. That is, the microprocessor includes multiple execution units and is capable of issuing multiple instructions to the execution units in a single clock cycle. Many modern microprocessors also perform out-of-order execution. That is, the microprocessor may execute instructions out of the order specified by the program that includes the instructions. Superscalar out-of-order execution microprocessors typically attempt to maintain a relatively large pool of outstanding instructions so that they can take advantage of a larger amount of instruction parallelism.

Many modern microprocessors also perform speculative execution of instructions. That is, the microprocessor executes instructions, or at least performs some of the actions prescribed by the instruction, before knowing certainly whether the instruction will actually complete. There are reasons why an instruction may not complete. For example, the microprocessor may have mispredicted a branch instruction that is older than the instruction in question. For another example, the microprocessor may take an exception before the instruction in question completes. The exception may be asynchronous, such as an interrupt, or it may be synchronous, i.e., caused by an instruction, such as a page fault, divide by zero condition, general protection error, and so forth. The exception-causing instruction may be the instruction in question or an instruction older than the instruction in question. Although the microprocessor may perform some of the actions prescribed by the instruction speculatively, the microprocessor is not allowed by the architecture to update the architectural state of the system with the results of an instruction until the instruction is no longer speculative, i.e., until it is certain that the instruction will complete.

Many modern microprocessors further perform hardware prefetches. Hardware prefetching in general means bringing data (or instructions) from memory into a cache memory in anticipation of a future need for that information. Hardware prefetches are highly speculative in nature since there is a significant chance that the retrieved information will not be used. A hardware prefetcher includes detectors or the like that recognize patterns and accesses in the microprocessor and spawn requests to retrieve information before it is needed or even requested by software. Conventional hardware prefetchers, however, stop when hitting or approaching a page boundary. Since the page size may be unknown, the smallest size of 4 KB is usually presumed. The page boundary limitation is somewhat based on legacy systems that rely on physical addresses in which accesses across a page boundary may be problematic.

In a virtual memory system, a virtual address of a hardware prefetch is first converted to a translated physical address. In the event that the translated address is not found in the TLB, a tablewalk is performed to retrieve the translated address using the virtual address. Although the hardware prefetch may provide a significant advantage if the retrieved information is used during subsequent processing, the hardware prefetch tablewalk may block software-based tablewalks. A software-based tablewalk is based on an actual software or code instruction and thus has a higher priority than a hardware prefetch operation. Thus, it is not advantageous to force software-based tablewalks to wait on lower priority hardware prefetch tablewalks.

SUMMARY OF THE INVENTION

A hardware prefetch tablewalk system for a microprocessor according to one embodiment includes a tablewalk engine and a hardware prefetch engine. The tablewalk engine may include tablewalk logic, a comparator, and priority logic. The tablewalk logic is configured to perform a tablewalk operation to retrieve a translated address for a received virtual address. The comparator is configured to compare priority values and to provide a comparison value. The priority logic is configured to receive a new tablewalk request including a virtual address and a priority value, to initiate a new tablewalk operation by the tablewalk logic for a virtual address associated with the new tablewalk request when the tablewalk logic is not currently performing a tablewalk operation, and to cause the tablewalk logic to flush a current tablewalk operation and to initiate the new tablewalk operation when the comparison value indicates that the new tablewalk request has a higher priority value than the current tablewalk operation. The hardware prefetch engine is configured to submit a hardware prefetch tablewalk request received by the tablewalk engine to perform a hardware prefetch tablewalk operation using a lowest priority value.

In one embodiment, the hardware prefetch engine is configured to perform boundless hardware prefetch pattern detection that is not limited by page boundaries to provide the hardware prefetch tablewalk request. In this manner, hardware prefetch tablewalk operations may be both ageless and boundless. Hardware prefetch tablewalk operations may be paused for various reasons, such as when it attempts to perform an operation that is not allowed, such as updating the architectural state of the microprocessor. The priority value may be an age value that indicates relative timing of instructions in the machine.

A microprocessor according to one embodiment includes at least one software module, a hardware prefetch engine, a translation lookaside buffer, and a tablewalk engine. Each software module is configured to submit a software-based request for a translated address corresponding to a software virtual address and a corresponding software priority value. The hardware prefetch engine is configured to monitor activity of the microprocessor and to submit a hardware-based request for a translated address corresponding to a hardware virtual address and a corresponding hardware priority value having a lowest priority. The translation lookaside buffer is configured to store translated addresses for corresponding virtual addresses, in which the translation lookaside buffer is configured to receive the data-based request, the code-based request, and the hardware-based request, and to provide a requested translated address when stored, and when not stored, to submit a corresponding new tablewalk request including a received virtual address and a received priority value. The tablewalk engine is configured to receive the tablewalk request, to initiate a new tablewalk operation to determine a corresponding translated address for the tablewalk request when idle, and to terminate a current tablewalk operation and to initiate the new tablewalk operation when a priority value of the new tablewalk request is higher than a priority value of the current tablewalk request.

The software modules may include a code module associated with fetching instructions. The software modules may include a memory module that is associated with data accesses.

A method capable of performing a hardware prefetch tablewalk according to one embodiment includes receiving a new tablewalk request including a new priority value to perform a new tablewalk operation, in which the new priority value is a lowest priority value when the request comprises a hardware prefetch tablewalk request, performing the tablewalk operation when a tablewalk operation is not currently being performed, when a tablewalk operation is currently being performed, comparing the new priority value with a current priority value, rejecting the new tablewalk request when the new priority value has lower priority than the current priority value, and terminating the current tablewalk operation and initiating the new tablewalk operation when the new priority value has higher priority than the current priority value unless currently updating a translation lookaside buffer.

The method may include pausing a hardware prefetch tablewalk operation when attempting to perform an operation that is not allowed. The method may include pausing a hardware prefetch tablewalk operation when attempting to update an architectural state of the microprocessor. The method may include generating the hardware prefetch tablewalk request by a hardware prefetch engine that is configured to perform boundless hardware prefetch pattern detection that is not limited by page boundaries. The method may include receiving a new tablewalk request including an age value.

BRIEF DESCRIPTION OF THE DRAWINGS

The benefits, features, and advantages of the present invention will become better understood with regard to the following description, and accompanying drawings where.

DETAILED DESCRIPTION

The inventor has recognized the inefficiencies associated with conventional hardware prefetch operations. He has therefore developed a system and method for performing hardware prefetch tablewalks having the lowest tablewalk priority. The system and method allows hardware prefetches to tablewalk without blocking tablewalk requests initiated by software. A software tablewalk request as used herein refers to either a code tablewalk initiated by an instruction cache request or a data tablewalk initiated by load/store cache requests. The system and method provides priority-based tablewalk processing so that tablewalk processing of a request having a "younger" age (lower priority) may be bumped by a request having an "older" age (higher priority). The system and method provides "ageless" hardware prefetch tablewalks in which each hardware prefetch tablewalk is considered youngest and thus has the lowest possible priority. In this manner, a hardware prefetch table walk request does not bump higher priority software tablewalks, and higher priority tablewalk requests may always bump a hardware prefetch tablewalk as long as is not performing a task that should not be interrupted.

Furthermore, a hardware prefetch tablewalk does not bump itself when it attempts to update the architectural state of the microprocessor 100, when it hits a strongly ordered situation, when it attempts to perform an operation that is not allowed, in the event of a page fault, etc. Instead, the hardware prefetch tablewalk is simply paused. The paused hardware prefetch tablewalk operation may eventually be flushed for various reasons, such as when the microprocessor is placed into an idle state, or when hardware prefetching is disabled asynchronously, or when bumped by another tablewalk request. Furthermore, the system and method allows hardware prefetches to be boundless in that they are not limited to page boundaries.

Figure 1:
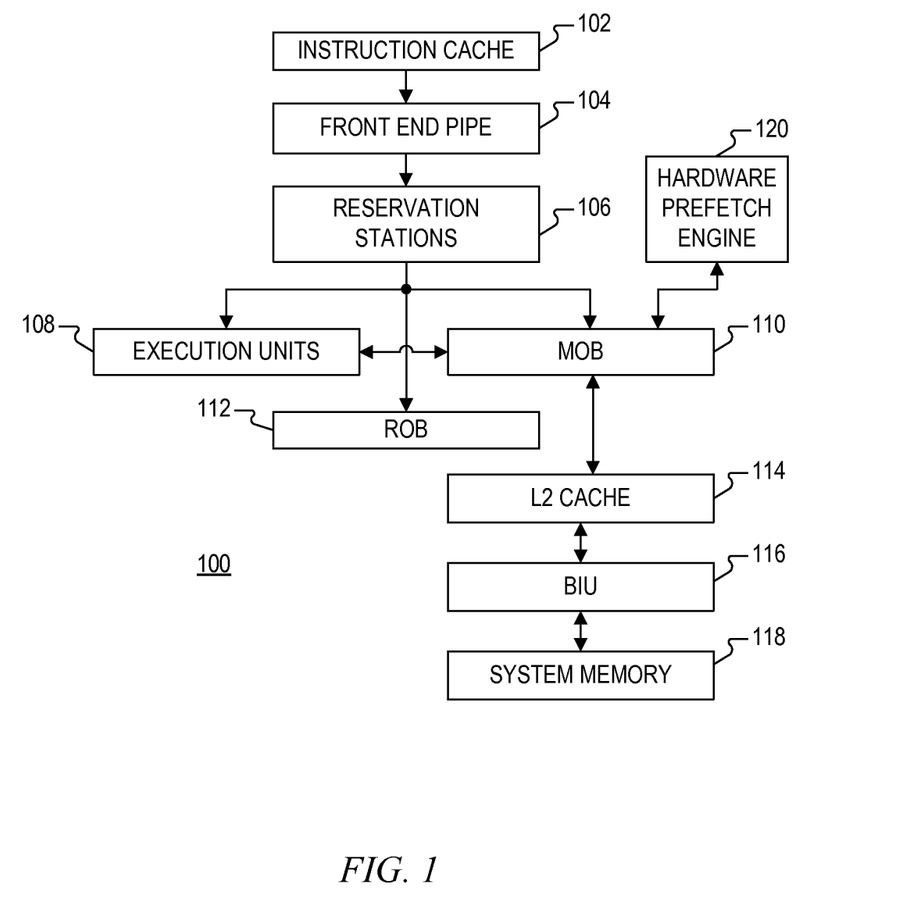
FIG. 1 is a simplified block diagram of a microprocessor including a hardware prefetch tablewalk system implemented according to an embodiment of the present invention.

FIG. 1 is a simplified block diagram of a microprocessor 100 including a hardware prefetch tablewalk system implemented according to an embodiment of the present invention. The macroarchitecture of the microprocessor 100 may be an x86 macroarchitecture in which it can correctly execute a majority of the application programs that are designed to be executed on an x86 microprocessor. An application program is correctly executed if its expected results are obtained. In particular, the microprocessor 100 executes instructions of the x86 instruction set and includes the x86 user-visible register set. The present invention is not limited to x86 architectures, however, in which microprocessor 100 may be according to any alternative architecture as known by those of ordinary skill in the art.

In the illustrated embodiment, the microprocessor 100 includes an instruction cache 102, a front end pipe 104, reservations stations 106, executions units 108, a memory order buffer (MOB) 110, a reorder buffer (ROB) 112, a level-2 (L2) cache 114, a bus interface unit (BIU) 116 for interfacing and accessing system memory 118, and a hardware prefetch engine 120. The instruction cache 102 caches program instructions from the system memory 118. The front end pipe 104 fetches program instructions from the instruction cache 102 and decodes them into instructions for execution by the microprocessor 100. The front end pipe 104 may include a decoder (not shown) and one or more translators (not shown) that collectively decode and translate macroinstructions into one or more instructions.

In one embodiment, instruction translation is a process that translates macroinstructions of a macroinstruction set of the microprocessor 100 (such as the x86 instruction set architecture) into microinstructions of a microinstruction set architecture of the microprocessor 100. For example, a memory access instruction may be decoded into a sequence of microinstructions that includes one or more load or store microinstructions. In other embodiments, the load and store microinstructions may be part of the native instruction set of the microprocessor 100. Microinstructions or micro-operations or the like are simply referred to herein as "instructions." The front end pipe 104 may also include a register alias table (RAT) (not shown) that generates dependency information for each instruction based on its program order, on the operand sources it specifies, and on renaming information.

The front end pipe 106 dispatches the decoded instructions and their associated dependency information to the reservation stations 106. The reservation stations 106 include queues that hold the instructions and dependency information received from the RAT. The reservation stations 106 also included issue logic that issues the instructions from the queues to the execution units 108 and the MOB 110 when they are ready to be executed. An instruction is ready to be issued and executed when all of its dependencies are resolved. In conjunction with dispatching an instruction, the RAT allocates an entry in the ROB 112 for the instruction. Thus, the instructions are allocated in program order into the ROB 112, which may be configured as a circular queue to guarantee that the instructions are retired in program order. The RAT also provides the dependency information to the ROB 112 for storage in the instruction's entry therein. When the ROB 112 replays an instruction, it provides the dependency information stored in the ROB entry to the reservation stations 106 during the replay of the instruction.

The microprocessor 100 is superscalar and includes multiple execution units and is capable of issuing multiple instructions to the execution units 108 in a single clock cycle. The microprocessor 100 is also configured to perform out-of-order execution. That is, the reservation stations 106 may issue instructions out of the order specified by the program that includes the instructions. Superscalar out-of-order execution microprocessors typically attempt to maintain a relatively large pool of outstanding instructions so that they can take advantage of a larger amount of instruction parallelism. The microprocessor 100 may also perform speculative execution of instructions in which it executes instructions, or at least performs some of the actions prescribed by the instruction, before it is know for certain whether the instruction will actually complete. An instruction may not complete for a variety of reasons, such as a mis-predicted branch instruction, exceptions (interrupts, page faults, divide by zero conditions, general protection errors, etc.), and so forth. Although the microprocessor 100 may perform some of the actions prescribed by the instruction speculatively, the microprocessor does not update the architectural state of the system with the results of an instruction until it is known for certain that the instruction will complete.

The MOB 110 handles interfaces with the system memory 118 via the L2 cache 114 and the BIU 116. The BIU 116 interfaces the microprocessor 100 to a processor bus (not shown) to which the system memory 118 and other devices, such as a system chipset, are coupled. The operating system running on the microprocessor 100 stores page mapping information in the system memory 118 which the microprocessor 100 reads and writes to perform tablewalks. The execution units 108 execute the instructions when issued by the reservation stations 106. In one embodiment, the execution units 108 may include all of the execution units of the microprocessor, such as arithmetic logic units (ALUs) and the like. In the illustrated embodiment, the MOB 110 incorporates the load and store execution units for executing load and store instructions for accessing the system memory 118 as further described herein. The execution units 108 interface the MOB 110 when accessing the system memory 118, and The hardware prefetch engine 120 is shown interfacing the MOB 110.

Figure 2:
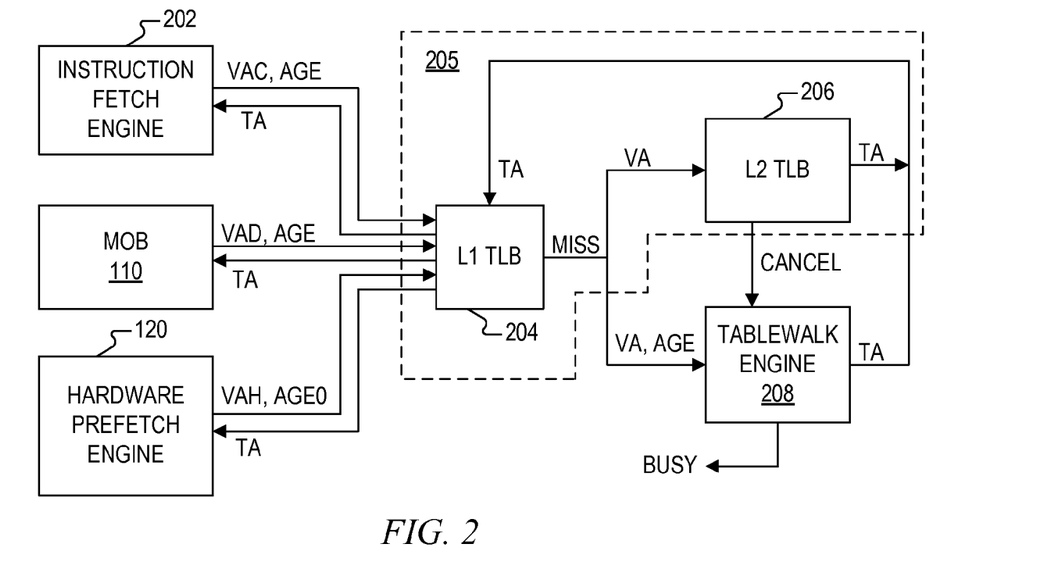
FIG. 2 is a simplified block diagram of a portion of the microprocessor of FIG. 1 that requests and converts a virtual address (VA) into a corresponding translated address (TA)

FIG. 2 is a simplified block diagram of a portion of the microprocessor 100 that requests and converts a virtual address (VA) into a corresponding translated address (TA). As used herein, the translated address may be a physical address or a physical address translation, and is referred to more generally as a translated address. A virtual address space is referenced using a set of virtual addresses (also known as "linear" addresses or the like) that an operating system makes available to a given process. The translated addresses are used to access instructions and data in system memory 118. An instruction fetch engine 202, the hardware prefetch engine 120, and the MOB 110 each provide a corresponding virtual address to a level-1 (L1) translation lookaside buffer (TLB) 204.

The L1 TLB 204 caches a limited number of translated addresses for corresponding virtual addresses. If the translated address TA corresponding to the virtual address is stored within the L1 TLB 204, then it is returned to the requesting entity. In one embodiment, the L1 TLB 204 includes an L1 instruction TLB (L1 I TLB) and an L1 data TLB (L1 D TLB).

If the translated address TA corresponding to the virtual address is not stored within the L1 TLB 204, then a MISS occurs in the L1 TLB 204 and the request is submitted to both a level-2 (L2) TLB 206 and to a tablewalk engine 208. The L2 TLB 206 also caches a limited number of translated addresses for corresponding virtual addresses, and is generally larger and slower than the L1 TLB 204. Also, the L2 TLB is unified in that it handles both code and data requests. The L1 and L2 TLBs 204 and 205 may be collectively referred to as the TLB 205. If the translated address TA is found within the L2 TLB 206, then it is provided to the L1 TLB 204, which then forwards the translated address TA to the requesting entity. In the event of a HIT within the L2 TLB 206 such that the translated address TA is found within the L2 TLB 206, then it submits a CANCEL signal to the tablewalk engine 208 to cancel the tablewalk operation just initiated. Also, if the subsequent request has a lower priority than the tablewalk operation currently being performed, the subsequent request may be rejected in which case the tablewalk engine asserts a BUSY signal or the like. Otherwise, the tablewalk engine 208 performs the tablewalk operation to retrieve and send the translated address TA to the L1 TLB 204, which forwards TA to the requesting entity.

It is noted that even when the translated address TA is located within the L2 TLB 206, a lower priority tablewalk operation currently being performed in the tablewalk engine 208 may be terminated and bumped even if the tablewalk engine 208 is not needed for the subsequent request. In an alternative embodiment, the virtual address VA may be provided to the tablewalk engine 208 only after a MISS occurs within the L2 TLB 206 to avoid prematurely terminating a current tablewalk operation. It is noted, however, that it may be advantageous to initiate the tablewalk operation as soon as possible for higher priority requests even when some tablewalk operations may be terminated. In the illustrated configuration, the request is submitted to both the L2 TLB 206 and the tablewalk engine 208 at the same time.

When the translated address TA is provided to the L1 TLB 204 from the L2 TLB 206 or the tablewalk engine 208, it may displace a victim entry within the L1 TLB 204. If so, the victim entry output from the L1 TLB 204 is stored within the L2 TLB 206. A victim pushed out of the L2 TLB 206 may be discarded.

The instruction fetch engine 202 monitors virtual addresses of the instruction pointer (IP) or the like and populates corresponding the instruction cache 102 with a page of instructions from the system memory 118. The instruction fetch engine 202 provides a virtual address, shown as VAC (code virtual address), to the L1 TLB 204 for retrieving the corresponding translated address TA. The instruction fetch engine 202 also generates and provides an AGE value along with VAC. The AGE value is used as a priority value for determining relative priority between tablewalk requests as further described herein.

In the illustrated configuration, the AGE values are timing values that identify the relative age of the requests being issued, and are used to distinguish between older and newer requests in the tablewalk engine 208. Other types of priority values may be used, such as those based on additional criterion including relative importance of requests. The AGE (and AGE0) values may follow the virtual addresses of the requests, but are not necessarily used by the TLB 205.

The MOB 110 submits a virtual address for load and store instructions, in which the virtual address is shown as VAD (data virtual address). Load and store instructions are memory access instructions for data ultimately located at corresponding translated addresses in the system memory 118. Load instructions may be performed out of order and speculatively in the illustrated configuration. Although store instructions may be executed out of program order, they are not committed speculatively. The MOB 110 generates a virtual address VA and an AGE value for each data type instruction.

The hardware prefetch engine 120 includes detectors or the like (not shown) that monitors activity of the microprocessor 100, such as by recognizing patterns and accesses by the MOB 110, and spawns hardware prefetch requests to retrieve information before it is needed or even requested by software. The hardware prefetch engine 120 generates a virtual address VA, shown as VAH (hardware virtual address) for accessing information that it determines will be needed at a subsequent time. The hardware prefetch engine 120 uses the retrieved translated address TA to load information in accordance with the prefetch determination. The hardware prefetch engine 120 also generates an artificial AGE value AGE0 that is assigned to each hardware prefetch virtual address by the hardware prefetch engine 120. The AGE0 value is artificial in that it does not reflect any actual time or age of the hardware prefetch request, but instead is a value that is considered "newer" or "younger" than any software-based age value associated with instructions. Since the AGE0 value for the hardware prefetch is considered younger than any AGE value generated for a software-based request, the hardware prefetch has the lowest priority.

As described herein, hardware prefetches performed by the hardware prefetch engine 120 are boundless in that the hardware prefetch engine 120 ignores page boundaries when determining a virtual address. A hardware prefetch is already highly speculative in nature and boundless hardware prefetches further increases the likelihood that the prefetched information may not be used. Thus, allowing the hardware prefetch engine 120 to consume valuable resources including the tablewalk engine 208 may be disadvantageous in that it potentially blocks higher priority software tablewalk requests generated by the instruction fetch engine 202 and/or the MOB 110. Nonetheless, if the tablewalk engine 208 is otherwise idle, it is advantageous to allow the hardware prefetch engine 120 to initiate a tablewalk operation as long as it does not block software-based tablewalks. A system and method for boundless and ageless hardware prefetch tablewalk as described herein improves utilization of the tablewalk engine 208 without blocking software tablewalk operations.

Figure 3:
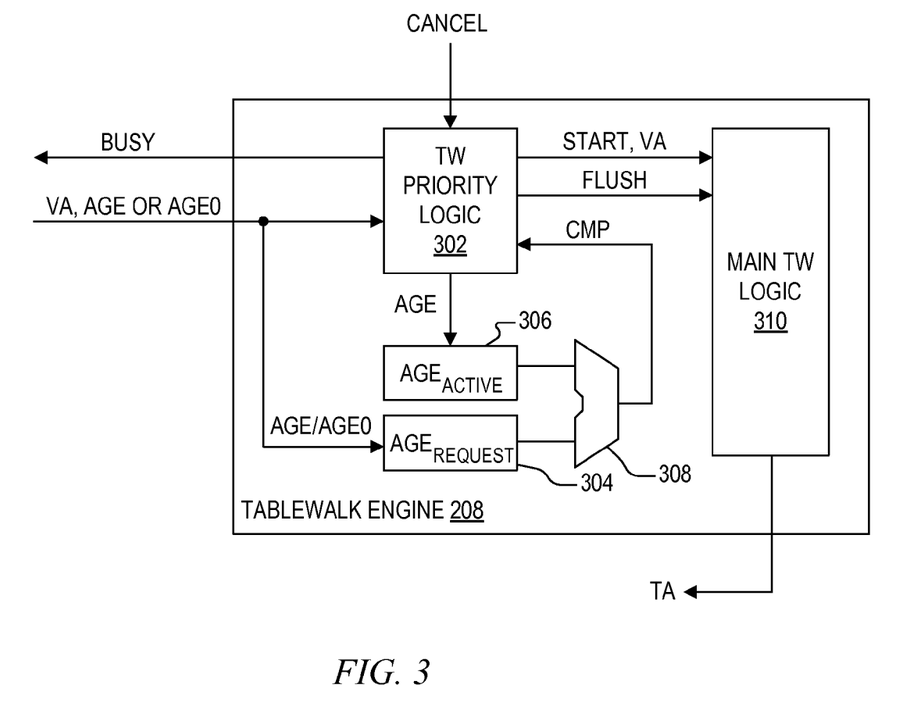
FIG. 3 is a simplified block diagram illustrating further details of the tablewalk engine configured to perform boundless and ageless hardware prefetch tablewalk operations according to one embodiment of the present invention.

FIG. 3 is a simplified block diagram illustrating further details of the tablewalk engine 208 configured to perform boundless and ageless hardware prefetch tablewalk operations according to one embodiment of the present invention. As previously described, a virtual address VA originates from the instruction fetch engine 202, the MOB 110 or from the hardware prefetch engine 120. The AGE value identifies the relative age and thus the relative priority of the request. For example, the AGE value distinguishes between older instructions and newer instructions originating from one or more instruction translators (not shown) within the front end pipe 104 that convert architectural instructions (instructions of an instruction set architecture (ISA) of the microprocessor 100, such as x86 ISA by Intel or the Advanced RISC Machines (ARM®) ISA or the like) into corresponding instructions. An older instruction has priority over newer instructions for tablewalk operations.

In one embodiment in which speculative code tablewalks are not supported, then the AGE values initiated by the instruction fetch engine 202 may be configured to be the "oldest" and thus have the highest priority. When speculative code tablewalks are supported, the age of the tablewalk may change. The age of a speculative code tablewalk is initially placed between the ages of real software-based data tablewalks and hardware prefetches. If the speculative code tablewalk has not completed prior to becoming non-speculative, then it becomes the oldest tablewalk with highest priority.

The virtual address VA and the corresponding age value AGE or AGE0 are provided to tablewalk (TW) priority logic 302 of the tablewalk engine 208. If for any reason the tablewalk engine 208 is unable to receive the request, then it responds with the BUSY signal or the like. The age value associated with the request, shown as $AGE_{REQUEST}$, is stored at a memory location 304. If the tablewalk engine 208 is currently processing a tablewalk operation, then the associated active age value, shown as $AGE_{ACTIVE}$, is stored at another memory location 306. A comparator 308 compares $AGE_{REQUEST}$ with $AGE_{ACTIVE}$ and outputs a comparison value CMP, which is provided to the TW priority logic 302. When a tablewalk operation is accepted for processing, the TW priority logic 302 provides a signal START and the virtual address VA to main TW logic 310 that performs the tablewalk operation. The TW priority logic 302 loads the memory location 306 with the corresponding AGE value corresponding with the request, so that it becomes the current active age value $AGE_{ACTIVE}$. The memory locations 304 and 306 may be implemented in any suitable manner, such as registers or the like. When the tablewalk operation is completed, the main TW logic 310 provides the corresponding translated address TA. The TW priority logic 302 may also terminate a current tablewalk operation by asserting a signal FLUSH to the main TW logic 310, which terminates the tablewalk operation and flushes any values associated therewith.

In operation, a request is submitted to the TW priority logic 302 to initiate a tablewalk operation for the provided virtual address. As previously noted, if the translated address is found within the L2 TLB 206, then it may cancel the request by asserting CANCEL. The received age value is loaded into the memory location 306 as $AGE_{REQUEST}$. If the tablewalk engine 208 is idle, then the virtual address VA is provided to the main TW logic 310 and the tablewalk operation is started. If the tablewalk engine 208 is busy processing a tablewalk operation, however, then the TW priority logic 302 determines the relative priority based on the comparison value CMP. If the new request has a lower priority, then the TW priority logic 302 rejects the request, such as by asserting BUSY. If the new request has a higher priority, and if the current tablewalk operation may be interrupted, such as when it is not updating architectural parameters including the TLB 205, then the current tablewalk operation is flushed and the higher priority tablewalk is initiated.

As previously described, when the new request is a hardware prefetch tablewalk, then AGE0 is loaded into the memory location 304 as $AGE_{REQUEST}$. If the tablewalk engine 208 is busy processing a tablewalk operation, then the hardware prefetch tablewalk request is rejected. If the tablewalk engine 208 is idle, then the hardware prefetch tablewalk request may be started in which case AGE0 is loaded into the memory location 306 as $AGE_{ACTIVE}$. Any subsequent software-based tablewalk request has higher priority than the hardware prefetch tablewalk operation. The tablewalk engine 208 terminates and flushes the hardware prefetch tablewalk operation in favor of a higher priority request (e.g., software-based request) as long as the hardware prefetch tablewalk operation is not at a point in which it may not be interrupted.

Figure 4:
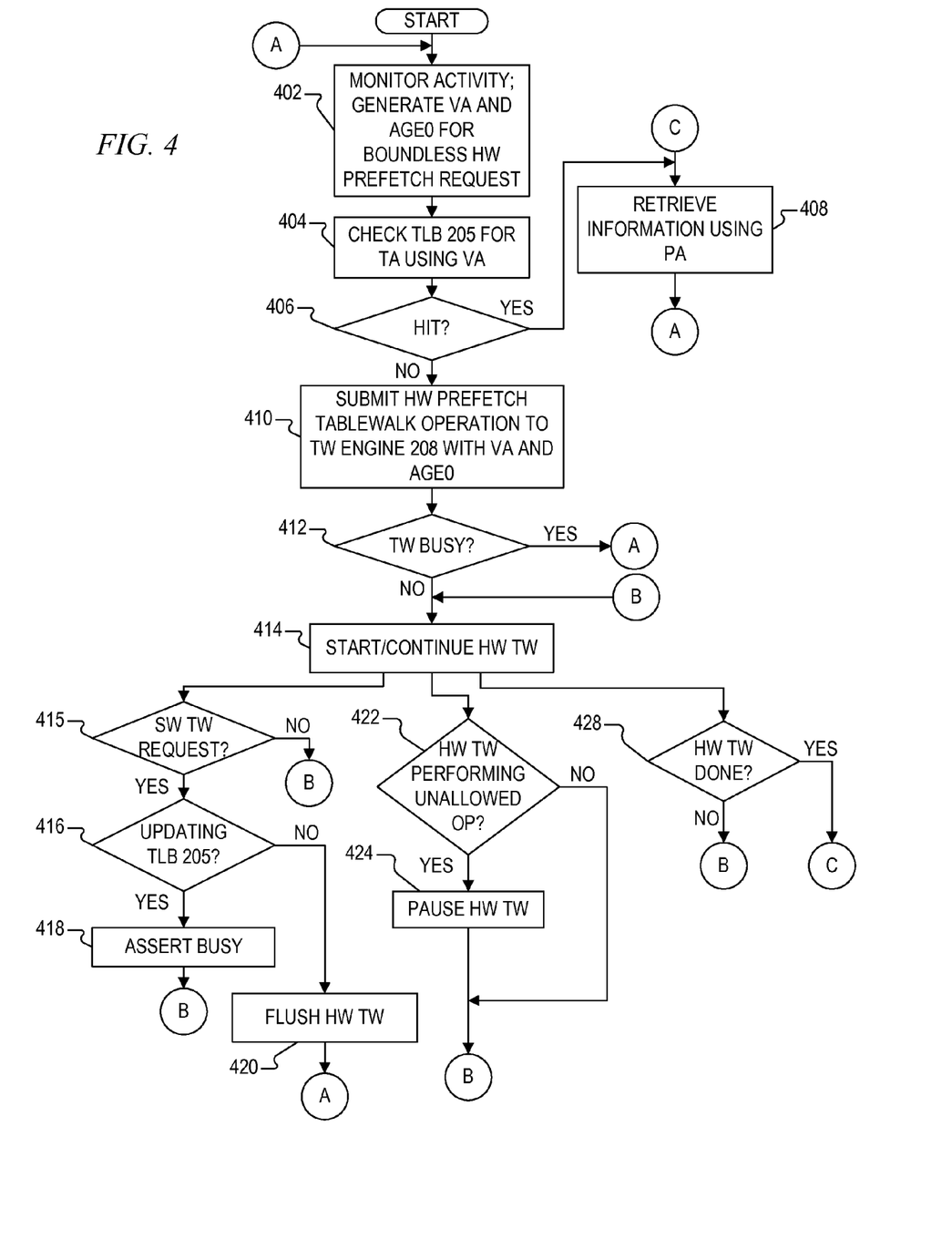
FIG. 4 is a flowchart diagram illustrating operation performed by the hardware prefetch engine, the TLB and the tablewalk engine of FIG. 2 for hardware prefetch tablewalk operations according to one embodiment of the present invention.

FIG. 4 is a flowchart diagram illustrating operation performed by the hardware prefetch engine 120, the TLB 205 and the tablewalk engine 208 for hardware prefetch tablewalk operations according to one embodiment of the present invention. The hardware prefetch engine 120 continuously (or at least periodically) monitors activity of the microprocessor 100 via the MOB 110 as previously described and generates a hardware (HW) prefetch request at 402 with a virtual address (VA) and AGE0. The hardware prefetch request is boundless in that the tablewalk engine 120 ignores or otherwise does not consider any page boundaries when generating the request. The virtual address VA is submitted to the TLB 205 (e.g., via the L1 TLB 204) to retrieve a corresponding translated address TA at 404. At 406, it is queried whether there is a hit within the TLB 205. If the virtual address VA hits within the TLB 205, then operation proceeds to 408 at which the tablewalk engine 208 uses the translated address TA to retrieve the information according to normal hardware prefetch operation. For example, the hardware prefetch engine 120 may load one or more cache lines into a data cache system within the MOB 110. Operation then returns to 402 to generate another boundless hardware prefetch request. Operation may loop between 402 and 408 as long as translated addresses are found in the TLB 205.

The flowchart diagram is simplified in that when the TLB 205 is checked for the translated address TA at 404, this includes the L1 TLB 204 followed by the L2 TLB 206 in the event of the MISS within the L1 TLB 204. As previously described, in the event of a MISS within the L1 TLB 204, then the request is submitted both to the L2 TLB 206 and to the tablewalk engine 208. As previously noted, however, in the event of a hit within the L2 TLB 206, the tablewalk operation initiated by the tablewalk engine 208 is canceled.

If the virtual address VA is not found in the TLB 205, then the hardware prefetch request is submitted to the tablewalk engine 208 at 410 using the virtual address VA and the age value AGE0. At 412, it is queried whether the tablewalk engine 208 is busy with another tablewalk operation. In one embodiment, only one hardware prefetch is submitted at a time. Since the hardware prefetch request is submitted with the age value AGE0, it has the lowest priority and the TW priority logic 302 does not flush a current tablewalk operation and asserts BUSY to reject the new request. In another embodiment, multiple hardware prefetch requests may be submitted at the same time. Nonetheless, the TW priority logic 302 does not interrupt a current hardware prefetch tablewalk operation (older) for a subsequent hardware prefetch tablewalk operation (newer) so that the new hardware tablewalk request is typically rejected. When the tablewalk engine 208 is determined to be busy at 412, operation returns back to 402 in which the hardware prefetch engine 120 continues monitoring operation to submit the same or a different HW prefetch request.

If the tablewalk engine 208 is not busy as determined at 412, then operation proceeds to 414 in which the tablewalk engine 208 processes the requested hardware prefetch tablewalk operation. During the tablewalk operation for the hardware prefetch, several different processing considerations are monitored sequentially or simultaneously as illustrated by different loops in the flowchart. The hardware prefetch tablewalk operation may be interrupted by a software-based tablewalk request, it may attempt an operation that is not allowed in which it is paused, or it may complete. Although not shown, any tablewalk operation, including hardware prefetch tablewalk operations, may be interrupted by the system for various other reasons beyond the scope of the present disclosure.

A software-based tablewalk request may be received as shown at 415. If not, the hardware prefetch tablewalk operation continues to process. If a software-based tablewalk is received, then operation proceeds to 416 in which it is queried whether the current hardware prefetch tablewalk operation is updating the TLB 205. If so, then it is not desired to interrupt the hardware prefetch tablewalk operation even with a higher priority tablewalk request, and operation proceeds to 418 in which BUSY is asserted. The software-based tablewalk request may be queued and resubmitted at a later time and is only slightly delayed as the hardware prefetch tablewalk operation is near completion. Otherwise, if the hardware prefetch tablewalk operation is not updating the TLB 205, then operation proceeds to 420 in which the hardware prefetch tablewalk operation is terminated and flushed in favor of the software-based tablewalk request. Operation then returns to 402 to generate another boundless hardware prefetch request. In one embodiment, the tablewalk engine 208 need not query whether a software-based tablewalk request is received, but instead it is processed when received similar to an interrupt.

If the current hardware prefetch tablewalk operation attempts to perform an operation that is not allowed, such as attempting an architecture modification, hitting a strongly ordered situation (e.g., setting accessed bits or performing strongly ordered accesses), causing a page fault, etc., as determined at 422, then the hardware prefetch tablewalk operation is paused at 424. Rather than flushing the hardware prefetch tablewalk operation, it remains paused indefinitely until flushed by the system for any reason including termination by a higher priority software-based tablewalk request. If the current hardware prefetch tablewalk operation does not attempt an operation that is not allowed, then operation loops back to 414 to allow the hardware prefetch tablewalk operation to be completed. In this manner, rather than flushing the hardware prefetch tablewalk operation, it is indefinitely paused in the tablewalk engine 208 until it is flushed by the system for various reasons including being terminated by a higher priority request.

The hardware prefetch tablewalk operation continues until done as shown at 428, unless paused or bumped by a higher priority request. If the hardware prefetch tablewalk operation completes, operation proceeds to 408 in which the hardware prefetch engine 120 retrieves the target information using the translated address TA, and then proceeds to 402 to generate another boundless hardware prefetch request.

In summary, hardware prefetch tablewalk requests do not interrupt a tablewalk operation in progress and may always be bumped by a higher priority request unless it is almost completed and is updating the TLB 205. In this manner, hardware prefetch tablewalk operations are non-blocking A hardware prefetch tablewalk operation does not bump itself when it might otherwise attempt an operation that is not allowed. Instead, the hardware prefetch tablewalk operation is paused indefinitely or until bumped by a higher priority tablewalk request. If the hardware prefetch tablewalk operation is not interrupted, and if it does not attempt to perform an operation that is not allowed, then it completes so that the translated address TA is provided so that the desired information may be retrieved from the system memory 118. The hardware prefetch engine generates boundless requests that are not limited by page boundaries or the like. Thus, the hardware prefetch requests may be considered boundless and ageless.

The foregoing description has been presented to enable one of ordinary skill in the art to make and use the present invention as provided within the context of a particular application and its requirements. Although the present invention has been described in considerable detail with reference to certain preferred versions thereof, other versions and variations are possible and contemplated. Various modifications to the preferred embodiments will be apparent to one skilled in the art, and the general principles defined herein may be applied to other embodiments. For example, the circuits described herein may be implemented in any suitable manner including logic devices or circuitry or the like.

Those skilled in the art should appreciate that they can readily use the disclosed conception and specific embodiments as a basis for designing or modifying other structures for carrying out the same purposes of the present invention without departing from the spirit and scope of the invention. Therefore, the present invention is not intended to be limited to the particular embodiments shown and described herein, but is to be accorded the widest scope consistent with the principles and novel features herein disclosed.

What is claimed is:

1. A hardware prefetch tablewalk system for a microprocessor, comprising:
   a tablewalk engine, comprising:
      tablewalk logic configured to perform a tablewalk operation to translate a received virtual address into a translated address;
      a comparator configured to compare priority values and to provide a comparison value; and
      priority logic that is configured to:
         receive a new tablewalk request that includes a virtual address and a priority value;
         to initiate a new tablewalk operation by said tablewalk logic for translating a virtual address associated with said new tablewalk request into a corresponding translated address when said tablewalk logic is not currently performing a tablewalk operation; and
         to cause said tablewalk logic to flush a current tablewalk operation and to initiate said new tablewalk operation when said comparison value indicates that said new tablewalk request has a higher priority value than said current tablewalk operation; and
   a hardware prefetch engine that is configured to submit a hardware prefetch tablewalk request received by said tablewalk engine to perform a hardware prefetch tablewalk operation using a lowest priority value.

2. The hardware prefetch tablewalk system of claim 1, wherein said hardware prefetch engine is configured to perform boundless hardware prefetch pattern detection that is not limited by page boundaries to provide said hardware prefetch tablewalk request.

3. The hardware prefetch tablewalk system of claim 1, wherein said tablewalk logic does not flush said current tablewalk operation when said tablewalk engine is updating a translation lookaside buffer.

4. The hardware prefetch tablewalk system of claim 1, wherein said tablewalk logic does not flush said hardware prefetch tablewalk operation in response to a subsequent higher priority tablewalk request when said tablewalk engine is updating a translation lookaside buffer.

5. The hardware prefetch tablewalk system of claim 1, wherein said tablewalk logic pauses a current hardware prefetch tablewalk operation being performed to prevent said current hardware prefetch tablewalk operation from performing an operation that is not allowed.

6. The hardware prefetch tablewalk system of claim 5, wherein said tablewalk engine does not flush a paused hardware prefetch tablewalk operation until requested by the microprocessor or in response to a subsequent tablewalk request.

7. The hardware prefetch tablewalk system of claim 1, wherein said priority value comprises an age value that indicates relative age of a request indicative of relative priority.

8. The hardware prefetch tablewalk system of claim 1, wherein said priority logic is further configured to reject said new tablewalk request when said comparison value indicates that said new tablewalk request has lower priority value than said current tablewalk operation.

9. A microprocessor, comprising:
   a translation lookaside buffer that is configured to store a plurality of translated addresses for a corresponding plurality of virtual addresses, wherein said translation lookaside buffer is configured to receive a request for a translated address and to respond by providing a requested translated address when stored, and when not stored, by submitting a corresponding new tablewalk request including a received virtual address and a received priority value;
   at least one software module that is configured to submit said request for a translated address as a software-based request including a software virtual address and a corresponding software priority value for translating said software virtual address into a translated address;
   a hardware prefetch engine that is configured to monitor activity of the microprocessor and to submit said request for a translated address as a hardware-based request including a hardware virtual address and a corresponding hardware priority value having a lowest priority for translating said hardware virtual address into a translated address; and
   a tablewalk engine that is configured to receive said tablewalk request, to initiate a new tablewalk operation in response to said tablewalk request when idle to translate said received virtual address into a corresponding translated address, and to terminate a current tablewalk operation and to initiate said new tablewalk operation when a priority value of said new tablewalk request is higher than a priority value of said current tablewalk request.

10. The microprocessor of claim 9, wherein said at least one software module comprises:
   a code module that is configured to submit said request for a translated address as a code-based request for a translated address corresponding to a code virtual address and a corresponding code priority value; and
   a memory module that is configured to submit said request for a translated address as a data-based request for a translated address corresponding to a data virtual address and a corresponding data priority value;

wherein said code priority value and said data priority value each have higher priority than said hardware priority value.

11. The microprocessor of claim 9, wherein said tablewalk engine comprises:
   tablewalk logic configured to perform a tablewalk operation to retrieve a translated address for a received virtual address;
   a comparator configured to compare priority values and to provide a comparison value; and
   priority logic that is configured to receive said tablewalk request, to initiate a new tablewalk operation to be performed by said tablewalk logic, to terminate a current tablewalk operation being performed by said tablewalk logic, and to use said comparison value to determine priority between a current tablewalk operation and a new tablewalk request.

12. The microprocessor of claim 9, wherein said hardware prefetch engine is configured to perform boundless hardware prefetch pattern detection that is not limited by page boundaries to provide said hardware-based request.

13. The microprocessor of claim 9, wherein said tablewalk engine does not terminate said current tablewalk operation when updating said translation lookaside buffer.

14. The microprocessor of claim [1] 9, wherein said tablewalk engine pauses a hardware prefetch tablewalk operation to avoid performing an operation that is not allowed.

15. The microprocessor of claim 9, wherein said tablewalk engine is further configured to reject said new tablewalk request when said comparison value indicates that said new tablewalk request has lower priority value than said current tablewalk operation.

16. A method capable of performing a hardware prefetch tablewalk for a microprocessor, comprising:
   receiving a new tablewalk request including a new priority value to perform a new tablewalk operation, wherein the new priority value comprises a lowest priority value when the request comprises a hardware prefetch tablewalk request;
   performing the tablewalk operation when a tablewalk operation is not currently being performed, said performing comprising translating a virtual address into a translated address;
   when a tablewalk operation is currently being performed, comparing the new priority value with a current priority value;
   rejecting the new tablewalk request when the new priority value has lower priority than the current priority value; and
   terminating the current tablewalk operation and initiating the new tablewalk operation when the new priority value has higher priority than the current priority value unless currently updating a translation lookaside buffer.

17. The method of claim 16, further comprising pausing a hardware prefetch tablewalk operation when attempting to perform an operation that is not allowed.

18. The method of claim 16, further comprising pausing a hardware prefetch tablewalk operation.

19. The method of claim 16, further comprising generating the hardware prefetch tablewalk request by a hardware prefetch engine that is configured to perform boundless hardware prefetch pattern detection that is not limited by page boundaries.

20. The method of claim 16, wherein said receiving a new tablewalk request including a new priority value comprises receiving a new tablewalk request including an age value.

* * * * *

UNITED STATES PATENT AND TRADEMARK OFFICE
CERTIFICATE OF CORRECTION

PATENT NO. : 9,542,332 B2  
APPLICATION NO. : 14/540585  
DATED : January 10, 2017  
INVENTOR(S) : Colin Eddy Page 1 of 1

It is certified that error appears in the above-identified patent and that said Letters Patent is hereby corrected as shown below:

In the Claims

Column 15, Lines 25-28, should read:  
Claim 14. The microprocessor of claim 9, wherein said tablewalk engine pauses a hardware prefetch tablewalk operation to avoid performing an operation that is not allowed.

Signed and Sealed this  
First Day of August, 2017

Joseph Matal  
*Performing the Functions and Duties of the*  
*Under Secretary of Commerce for Intellectual Property and*  
*Director of the United States Patent and Trademark Office*